US011186123B2

(12) United States Patent
Knisley

(10) Patent No.: US 11,186,123 B2
(45) Date of Patent: Nov. 30, 2021

(54) VEHICLE TIRE PITCH SEQUENCE DESIGN METHODOLOGY AND ASSOCIATED REDUCED ROAD NOISE VEHICLE TIRES

(71) Applicant: American Kenda Rubber Industrial Co., Ltd., Reynoldsburg, OH (US)

(72) Inventor: Samuel B Knisley, North Canton, OH (US)

(73) Assignee: American Kenda Rubber Industrial Co., Ltd., Reynoldsburg, OH (US)

( * ) Notice: Subject to any disclaimer, the term of this patent is extended or adjusted under 35 U.S.C. 154(b) by 612 days.

(21) Appl. No.: 16/114,952

(22) Filed: Aug. 28, 2018

(65) Prior Publication Data

US 2020/0070585 A1 Mar. 5, 2020

(51) Int. Cl.
| | |
|---|---|
| *B60C 11/11* | (2006.01) |
| *B60C 11/03* | (2006.01) |
| *G06F 30/20* | (2020.01) |
| *G06F 30/15* | (2020.01) |
| *G06F 111/10* | (2020.01) |
| *G06F 119/10* | (2020.01) |

(52) U.S. Cl.
CPC .......... *B60C 11/0318* (2013.01); *G06F 30/20* (2020.01); *G06F 30/15* (2020.01); *G06F 2111/10* (2020.01); *G06F 2119/10* (2020.01)

(58) Field of Classification Search
CPC ..... B60C 11/0318; G06F 30/20; G06F 30/15; G06F 2111/10; G06F 2119/10
See application file for complete search history.

(56) References Cited

U.S. PATENT DOCUMENTS

| | | | |
|---|---|---|---|
| 3,926,238 A | 12/1975 | Vorih | |
| 4,178,199 A | 12/1979 | Lippman et al. | |
| 4,327,792 A * | 5/1982 | Landers | .............. B60C 11/11 152/209.2 |
| 4,474,223 A | 10/1984 | Landers | |
| 5,617,341 A * | 4/1997 | Nakajima | ......... B60C 11/0318 152/209.2 |
| 5,717,613 A | 2/1998 | Nakajima | |
| 6,112,167 A * | 8/2000 | Zakelj | .............. B60C 11/0318 702/191 |
| 6,363,984 B1 | 4/2002 | Morgan | |
| 6,531,012 B2 * | 3/2003 | Ishiyama | ............ B60C 11/00 152/209.15 |

(Continued)

FOREIGN PATENT DOCUMENTS

| | | | | |
|---|---|---|---|---|
| EP | 0268436 B1 * | 3/1992 | ........ | B60C 11/0318 |
| EP | 0438108 B1 * | 3/1995 | ........ | B60C 11/0318 |
| JP | 2005246931 A * | 9/2005 | | |

*Primary Examiner* — Rehana Perveen
*Assistant Examiner* — Daniel E Miller
(74) *Attorney, Agent, or Firm* — Standley Law Group LLP; Eric M. Gayan; Stephen L. Grant

(57) ABSTRACT

Exemplary embodiments described herein are directed to tire pitch sequence design methodologies that are usable to develop tire tread pitch sequences that will minimize objectionable tonal qualities and disperse the acoustic energy produced during tire rotation across a wider frequency band. The exemplary design methodologies employ iterative randomization of pitch subsequences, waveform generation and analysis of pitch subsequences and full pitch sequences, and associated sorting and ranking using an objective function with an applied penalty factor.

19 Claims, 14 Drawing Sheets

(56) References Cited

U.S. PATENT DOCUMENTS

| | | |
|---|---|---|
| 7,006,930 B2 | 2/2006 | Stuckey |
| 7,769,567 B2 | 8/2010 | Stuckey |
| 2003/0040886 A1* | 2/2003 | Stuckey .............. B60C 11/0318 702/183 |

* cited by examiner

| FOR A 70-PITCH SEQUENCE, HAVING 4 PITCH SIZES: | | | | |
|---|---|---|---|---|
| | SMALL (#1) | | | |
| | MEDIUM (#2) | | | |
| | LARGE (#3) | | | |
| | X-LARGE (#4) | | | |
| DESIGN VARIABLES | | | | |
| | | PITCH RATIOS | PITCH QUANTITY | |
| | MEDIUM (#2) | LARGE (#3) | SMALL (#1) | |
| LOWER BOUNDS | 1.125 | 1.25 | 15 | |
| UPPER BOUNDS | 1.2 | 1.375 | 20 | |
| CONSTANT SETTINGS | | | | |
| | SMALL (#1) PITCH RATIO = 1.0 | | | |
| | X_LARGE (#4) PITCH RATIO = 1.4 | | | |
| DEPENDENT VARIABLES | | | | |
| | X_LARGE (#4) PITCH QUANTITY = SMALL (#1) PITCH QUANTITY | | | |
| | MEDIUM (#2) PITCH QUANTITY = (70/2) - SMALL (#1) PITCH QUANTITY | | | |
| | LARGE (#3) PITCH QUANTITY = (70/2) - SMALL (#1) PITCH QUANTITY | | | |

FIG. 8A

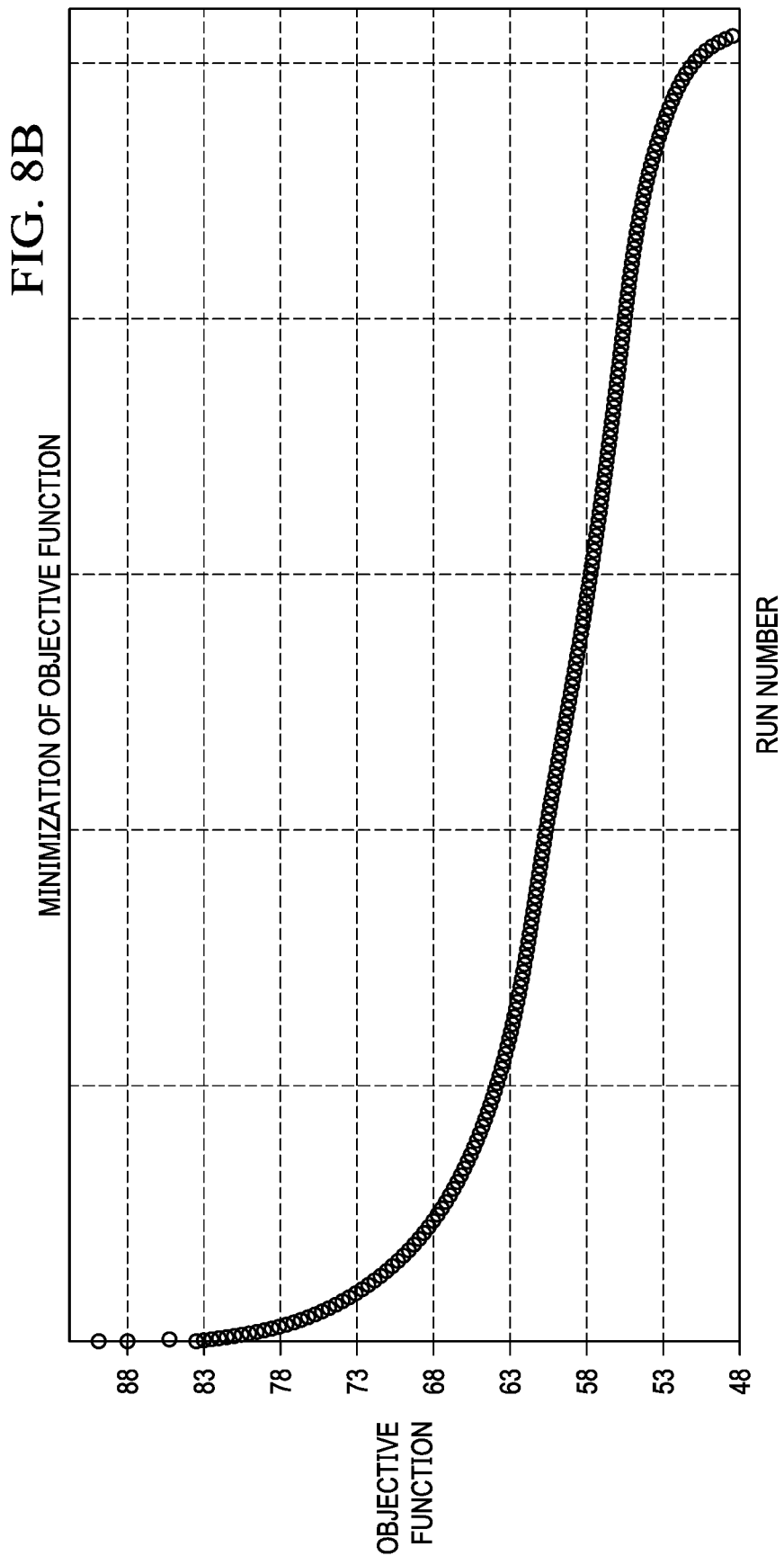

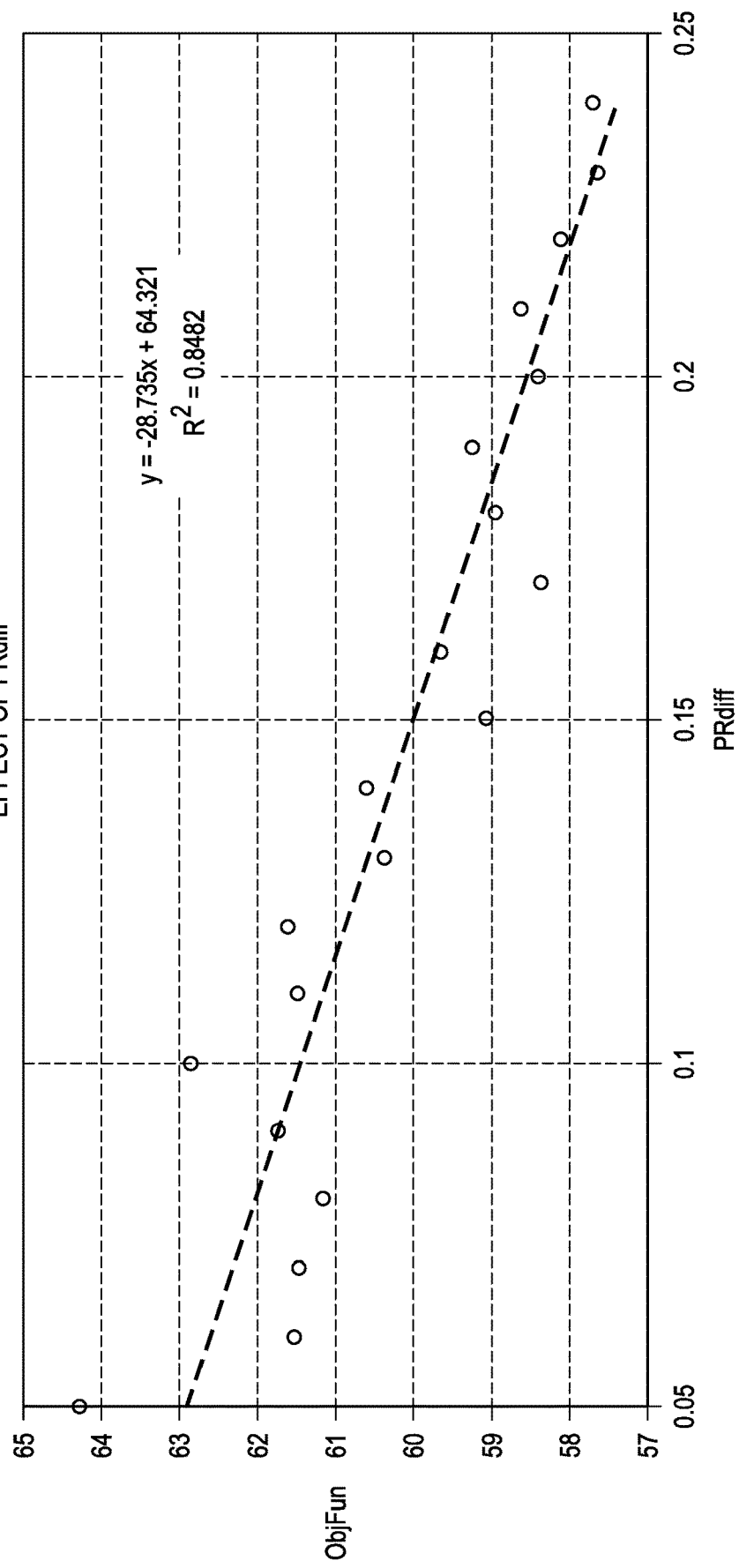

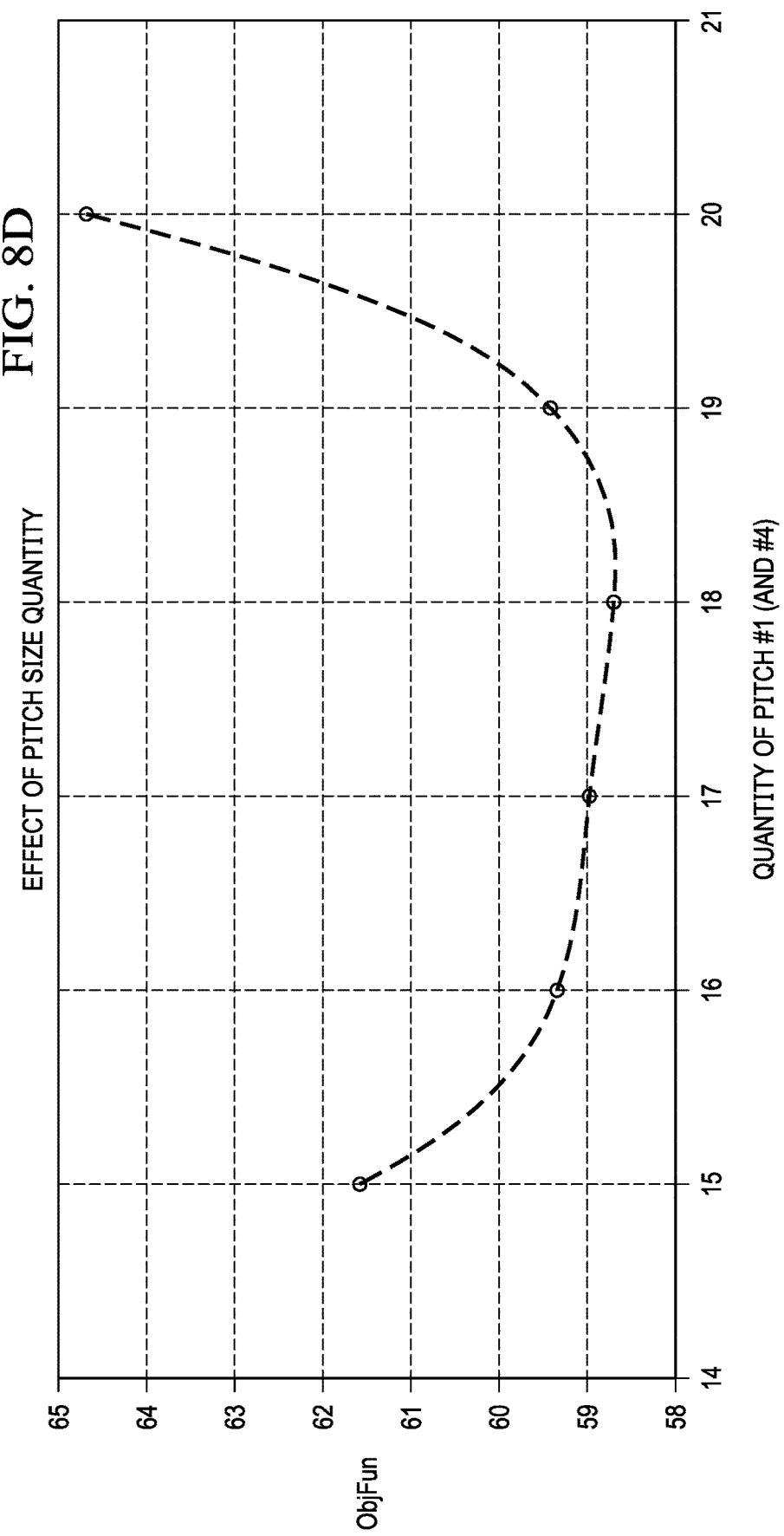

VEHICLE TIRE PITCH SEQUENCE DESIGN METHODOLOGY AND ASSOCIATED REDUCED ROAD NOISE VEHICLE TIRES

TECHNICAL FIELD

The exemplary embodiments disclosed herein are directed to pitch sequence design methodologies for creating reduced road noise vehicle tires and to vehicle tires designed according to said design methodologies.

BACKGROUND

A vehicle tire is essentially a circular structure having a road-contacting tread comprised of a plurality of load-bearing elements referred to as tread blocks or pitches, that are typically circumferentially arranged in conjunction with a plurality of separating grooves along a road-contacting surface of the tire. The arrangement of the tread blocks and grooves generally defines the tire tread pattern.

As should be familiar to at least most persons, tire rotation during associated vehicle movement typically results in "tonal" road noise, which may be exacerbated by vehicle speed and/or the surface upon which the vehicle tires roll. It is well understood within the industry that this road noise may be caused by a number of phenomena that occur during tire rotation as the tread blocks of the tires make contact with and leave contact with the road surface. These phenomena are well-documented in the art and include, but are certainly not limited to, movement of air through the grooves between the tread blocks.

Over the years, various techniques for creating reduced road noise tire tread pattern designs have been developed and practiced. While reductions in tire road noise have no doubt been achieved using known design techniques, there is nonetheless a need for vehicle tires with tread patterns that produce even less road noise. The exemplary tire pitch sequence design methodologies described herein are usable to design reduced noise vehicle tire tread patterns.

SUMMARY

The exemplary tire pitch sequence design methodologies (hereinafter also just "design methodologies" for brevity) described herein are usable to develop tire tread patterns that can better modulate the noise generated by pavement contact during tire rotation. The exemplary design methodologies described herein may be used with any tire tread pattern design for any tire circumference to minimize objectionable tonal qualities and to disperse the acoustic energy produced during tire rotation across a wider frequency band, such as a frequency band similar to that of so-called "white noise".

As mentioned above, a given tire tread pattern is made up primarily of a multitude of spaced apart tread blocks (pitches) that are often arranged as circumferential ribs. The pitches may be of a single shape, or pitches of various different shapes may be employed. Similarly, the pitches may be of dissimilar dimension, including but not limited to pitch length. Once a tire designer has selected a desired total number of pitches and pitch lengths, optimizing a tire tread pattern for purposes of noise reduction includes sequencing the pitches in some pattern around the circumference of the tire, such that during tire rotation, the noise generated by pitch contact with the road will be spread across a wide frequency range.

Exemplary design methodologies are usable to develop a pitch sequence that will result in a desired minimization of road noise for a given tread pattern. In practice, once the number of different pitches and pitch lengths that will be used in the tread pattern has been determined, the circumference of the tire to which the tread pattern will be applied is divided into multiple circumferential harmonic segments of variable length. A quantity of pitches having the various pitch lengths selected for use in the sequence is then preferably applied to each of the circumferential harmonic segments. Broadly speaking, minimization of objectionable tonal qualities and dispersion of the acoustic energy produced during tire rotation is accomplished according to the general inventive concept by producing a randomized arrangement of the pitches in each harmonic segment, which results in reduced noise contribution from each circumferential zone.

As would be understood by one of skill in the art, the result of the foregoing steps is a tread pattern comprised of a number of different pitches within each of the circumferential harmonic segments encircling the tire. The specific arrangement of the pitches within a harmonic segment—referred to herein as a subsequence—is iteratively randomized. An impulse train is generated for the randomized subsequence by assuming an impact function at the leading edge of each pitch, and subsequently analyzed via waveform analysis to generate the response frequency spectrum the subsequence would produce during rotation of the tire. This differs from most conventional pitch sequence design techniques, where the entire pitch sequence is iteratively randomized and then analyzed. During the randomization process, each subsequence iteration may be pre-screened to ensure compliance with various design practices common in the art, such as for example, design practices related to tire wear and handling performance.

The result of the aforementioned randomized iteration and pre-screening process is normally a multitude of valid subsequences. For example, it is not uncommon for more than 100,000 valid subsequences to be generated and evaluated for each harmonic segment during practice of an exemplary design methodology, with the best subsequences retained for further analysis. The sound quality of the harmonic noise spectrum associated with each of the candidate subsequence designs is analyzed and graded by use of an objective function, as described in more detail below.

Upon obtaining a set of subsequence design candidates that minimize tonality in each harmonic segment, the segment subsequences are assembled to produce a full pitch sequence design. Variations of all the candidate subsequences for all harmonic segments may then be tested and evaluated to identify the best full pitch sequence. The analysis may also be further extended to consider all possible sequencing of harmonic segments.

A full impulse train is then constructed by again assuming an impact waveform and performing waveform analysis to generate the response frequency spectrum that would be produced by the full pitch sequence during tire rotation. As with subsequence waveform analysis, the sound quality of the harmonic noise spectrum associated with the full pitch sequence design is then graded by use of the objective function referenced above. The minimum objective function preferably represents the noise spectrum having the most similarity to a "white noise" spectrum.

Additional sound quality improvements to the best full pitch sequence candidate may be realized by, for example, making slight modifications to the quantities of each pitch length, or minor adjustments to middle-sized pitch ratios. As described in more detail below, computer simulation may be utilized to systematically perform a parameter study to determine optimized settings for these design variables.

Other aspects and features of the inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIGS. 8A-8D illustrate one exemplary technique for optimizing the aforementioned objective function;

DETAILED DESCRIPTION OF THE EXEMPLARY EMBODIMENTS

Figure 1:
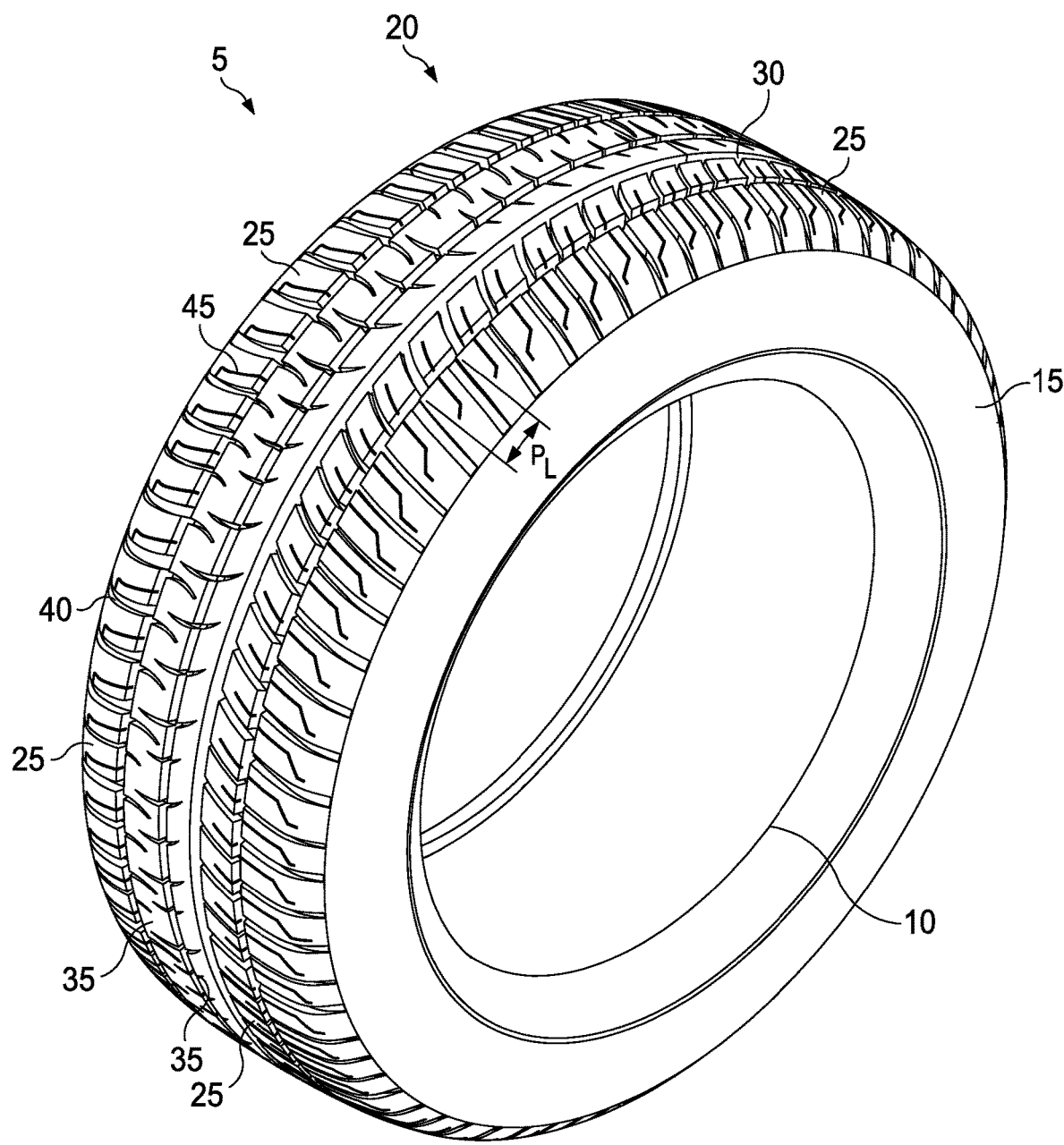
FIG. 1 depicts an exemplary embodiment of a known generic tire and associated tread pattern.

As described above, a given tire tread pattern is typically made up largely of a multitude of tread blocks (pitches) arranged along the circumference of the tire. An exemplary tire 5 of some circumference and width and including a wheel opening 10, a sidewall portion 15, and a pavement contacting tread pattern 20 comprising a plurality of pitches 25, is depicted in FIG. 1. The pitches of a given tire may be of a single shape or, as shown in FIG. 1, pitches 25 of various different shapes may be employed. Similarly, the pitches 25 may be of dissimilar dimension, including but not limited to pitch length $P_L$—pitch length being defined herein as the circumferential length from the leading edge of one pitch to the leading edge of a circumferentially adjacent pitch.

As also shown, the pitches 25 of a given tread pattern may be separated by one or more circumferential grooves 30, such that the pitches 25 are arranged at least partially in the form of one or more ribs 35. Non-circumferential (e.g., transverse or angled) grooves 40 also typically separate circumferentially adjacent pitches. As shown, some tire tread patterns may also include narrow slits or slices that pass in a non-circumferential direction through some or all of the pitches. These narrow slits or slices are commonly referred to as sipes 45, and are frequently used to improve traction in wet, snowy or ice road conditions.

Speaking very generally, designing a tire tread pattern using an exemplary pitch sequence design methodology described herein involves selecting pitch shape(s), selecting pitch size(s) including pitch length, and sequencing the various pitches such that the resulting tire will possess acceptable wear and handling characteristics while simultaneously generating as little objectionable road noise as possible during use on a vehicle.

A tire design typically begins with a tire designer creating an initial pitch based on desired tire size and service requirements. As would be understood by one of skill in the art, the total number of pitches around the tire and the maximum pitch ratio is also set by the designer according to specific design criteria requirements, such as engineering requirements of the resulting minimum and maximum pitch lengths for the given tire circumference, and performance requirements. The pitch ratios (relative lengths of each pitch) are further specified by the designer, with the maximum pitch ratio typically but not necessarily, being 1.4 or 1.5 depending on the tire application. If no specific pitch quantities or spacing between pitch ratios is specified by the designer, (near) equal quantities of each pitch length and equal spacing of the ratios may be initially used, and subsequently improved by employing numerical optimization techniques or partitioned multidimensional parameter studies as described below.

Figure 2:
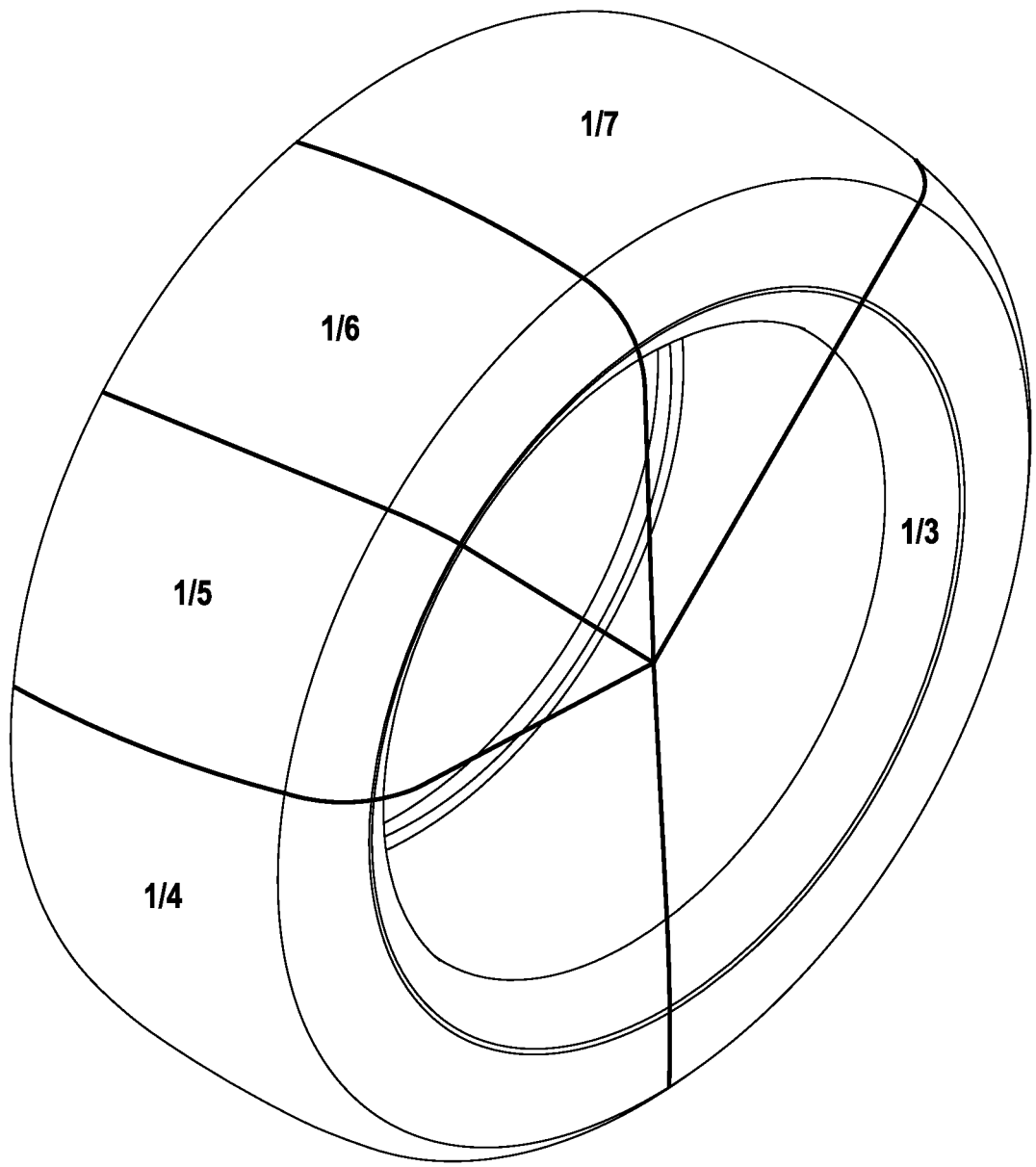
FIG. 2 represents an exemplary tire divided into a number of circumferential harmonic segments according to an exemplary pitch sequence design methodology.
Figure 3:
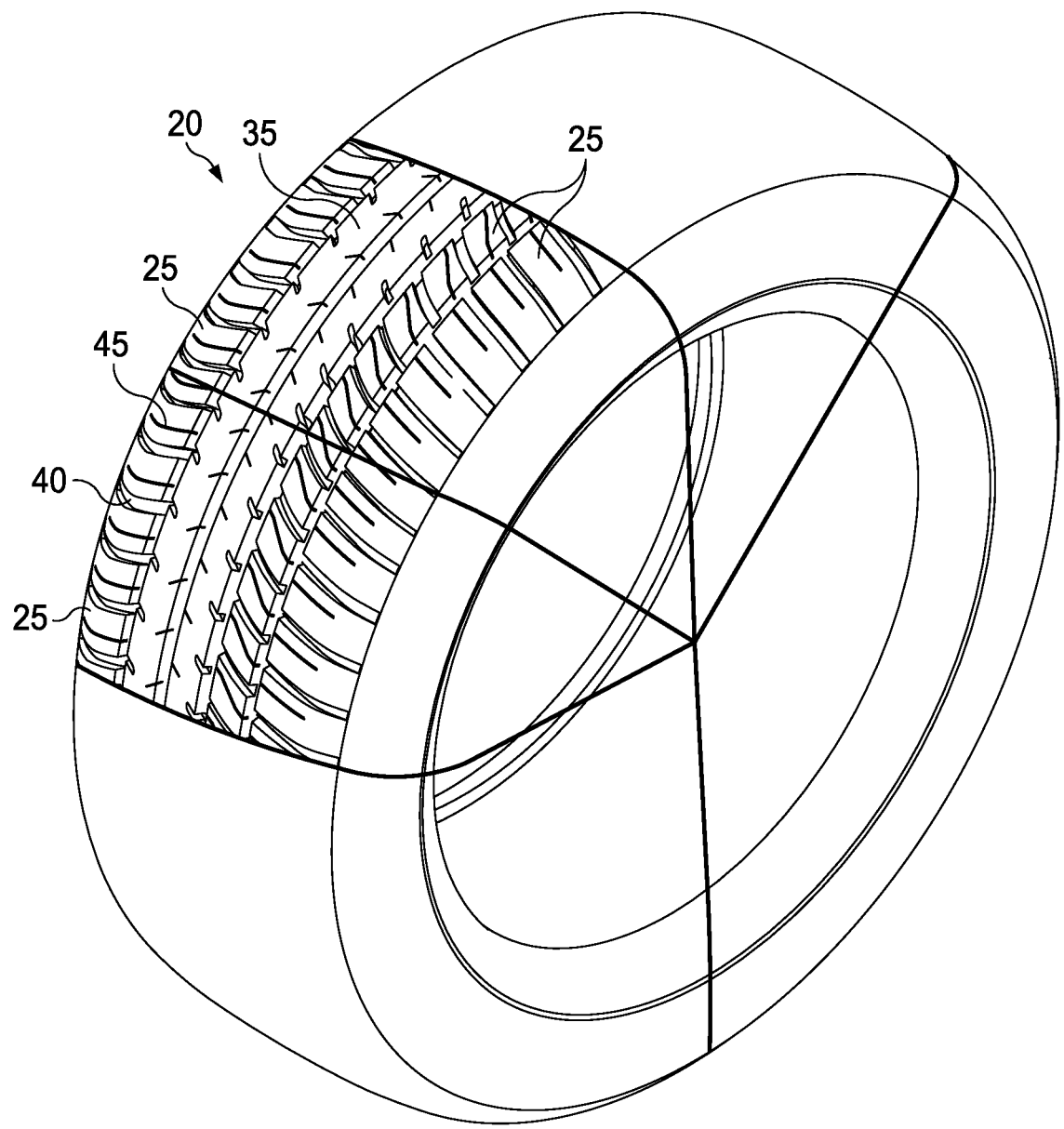
FIG. 3 illustrates the tire of FIG. 2 after a number of pre-selected pitches have been applied to a given harmonic segment.

As represented in FIG. 2, when using an exemplary design methodology to develop a tread pattern for a tire, the circumference of the tire is initially divided into multiple circumferential harmonic segments $S_1 \ldots S_n$ of diverse arc lengths Li $L_n$. The number of harmonic segments $S_1 \ldots S_n$ into which the tire circumference is divided may be determined by multiple techniques, such as but not limited to, the technique described in U.S. Pat. No. 4,474,223 to Landers. However, while Landers prescribes the arrangement of the pitches in each harmonic segment so that the pitch sizes change from one extreme to the other and back again in a sinusoidal pattern, the inventive concept contrastingly produces a randomized arrangement of the pitches in each segment that results in reduced noise contribution from each circumferential zone.

Accordingly, the required number of harmonic segments into which a given tire should be divided may be determined in part by using the equation:

$$NS = \text{int}\frac{[NP \times (LP - SP)]}{[B \times (LP + SP)]} \quad \text{(Eq. 1)}$$

where NP is the total number of pitches; LP is the maximum pitch ratio; SP is the minimum pitch ratio; and B is the modulation index, which is set to 2.9. Furthermore:

$$Nm = 1 + \text{int}\frac{c}{10/44.704} \quad (\text{Eq. 2})$$

where Nm is minimum number of harmonic segments; and C is the circumference of the tire (in millimeters). The number of harmonic segments employed in a given tread pattern design is the maximum of NS and Nm. Unlike certain known pitch sequence design methodologies, no adjustments need to be made to the selected total number of pitches (NP), the maximum pitch ratio (LP) or the minimum pitch ratio (SP).

Depending on the number of harmonic segments, the approximate segment lengths (as a percentage of the tire circumference) may be determined by the geometric progression:

$$1 \cong \Sigma_{j=1}^{j=n}(i+j-1)^{-1} \quad (\text{Eq. 3})$$

where n is the number harmonic segments; and i is an integer ≥2 that most closely satisfies Equation 3. Harmonic segment lengths may be further adjusted by computing an adjusted fraction (e.g., as described in Landers).

With the number of harmonic segments determined, pitches are then applied to each segment. The arrangement order of the pitches within each harmonic segment is aimed to distribute the acoustic energy produced during tire rotation across a broad band of frequencies so as to reduce tonality within the subsequence. Therefore, to the extent possible, quantities of each pitch length are preferably apportioned substantially equally among the segments. Substantially equal pitch apportionment results in the various pitch lengths being distributed more evenly around the tire circumference, which also promotes improved handling linearity and reduces irregular wear patterns caused by a concentration of low or high relative tread block stiffness. While it may be preferable to set the quantities of each pitch length to be equal or substantially equal, exemplary design methodologies may also be successfully applied when there exists a concentration of a single pitch length or a subset of pitch lengths, provided the proportional relationship of pitch lengths within each harmonic segment is uniformly maintained.

The quantity of any given pitch length may not be an even multiple of the number of harmonic segments into which a given tire circumference has been divided. Consequently, the number of remainder pitch lengths—designated as the mathematical remainders following mathematical division of the quantities of each pitch length by the number of segments—are preferably distributed among the segments in a systematic manner so as to closely match the target arc length of each segment.

As should be understood by one of skill in the art, the result of the foregoing steps is the application of a number of different pitches to each of the circumferential harmonic segments encircling the tire. The specific arrangement of the pitches within a harmonic segment is referred to herein as a "subsequence".

Once the pitches have been applied to each harmonic segment, each pitch subsequence is iteratively randomized via specialized computer program and subsequently subjected to waveform analysis. This also differentiates the inventive design methodologies from conventional pitch sequence design techniques known to the inventor, where an entire tread pattern pitch sequence is iteratively randomized and then analyzed.

Within the iterative randomization scheme, potential random sequences may be undesirable from the standpoint of producing irregular wear or less than ideal handling performance. For this reason, each subsequence is preferably pre-screened to meet tire design practices common in the art. Pre-screening may be performed, for example, by computerized means executing a specialized pre-screening algorithm. One example of a design practice that may be considered during subsequence pre-screening reduces the potential for irregular (e.g., "heel and toe") wear due to large variations of stiffness between circumferentially adjacent tread lugs by limiting the number of times the largest pitch length occurs adjacent to the smallest pitch length.

To this end, the pre-screening functionality of an exemplary design methodology may eliminate designs where the number of occurrences of the largest pitch length occurring adjacent to the smallest pitch length over the total circumference of the tire is equal to or exceeds some percentage of the total number of pitches in the full pitch sequence. For example, the pre-screening functionality of an exemplary design methodology may be set so as to pass only those full pitch sequences where the number of occurrences of the largest pitch length occurring adjacent to the smallest pitch length over the total circumference of the tire is less than 10% of the total number of pitches in the full pitch sequence. A similar elimination technique may also or instead focus on the same situation at the subsequence level where, of course, the allowable number of occurrences of the largest pitch length occurring adjacent to the smallest pitch length would be a fraction of the limit for the total circumference, proportional to the length of the harmonic segment relative to the total circumference.

It should be realized, however, that there may be exceptions to the aforementioned 10% limit (or other selected limit), and the actual percentage used by a given pre-screening function may vary based on the number of pitch lengths and their quantities. As one such exception to the exemplary 10% limit rule, consider a 60-pitch sequence having 3 pitch lengths, where 24 of the pitches are of small pitch length, 12 of the pitches are of medium pitch length, and 24 of the pitches are of large pitch length, resulting in a minimum number of 8 instances where a pitch of large pitch length and a pitch of small pitch length must lie adjacent to one another.

Another example of a design practice that may be considered during subsequence pre-screening is related to linear handling performance and strives to maintain a homogeneous blend of pitch sizes around the tire circumference. It is commonly-known in tire tread pattern design practice that circumferential variations of stiffness in successive pitches can have an undesirable effect on irregular pattern wear (i.e., "heel and toe" wear). Extended circumferential zones around the tire circumference containing a concentration of either large or small pitch sizes can also produce rapid fluctuations on the overall lateral stiffness provided at the contact patch, which may be sensed by the driver through steering feedback. Therefore, it is a goal of a pitch sequence to maintain a homogeneity of the pitch length variation around the tire, thereby minimizing potentially objectionable variations in lateral stiffness.

This goal may be accomplished by evaluating the running total of the differences of successive pitch lengths from the "mean" pitch length within a given subsequence. For example, the pre-screening function may tabulate the cumulative summation of the variance of pitch length numbers (i.e., 1, 2, 3, . . . ) from a mean pitch number (i.e., "2" for a 3-pitch sequence or "2.5" for a 4-pitch sequence). The peak value of the summation of the differences determines a penalty factor to be applied to the afore-mentioned objective function that will handicap the subsequence noise result in deference to the inferior homogeneity of the pitch lengths. This process effectively filters out subsequences with poor homogeneity, emphasizing a homogenized pitch sequence that is beneficial for linear handling performance. A more thorough explanation of the calculation and application of such an objective function and penalty factor is provided below relative to subsequence waveform analysis.

The result of the aforementioned randomized iteration and pre-screening process is normally a multitude of valid subsequences. It is not uncommon for more than 100,000 valid subsequences to be generated and evaluated for each harmonic segment during practice of an exemplary design methodology, with the best subsequences retained for further analysis. The valid subsequences are subsequently analyzed via waveform analysis to generate the response frequency spectrum the subsequence would produce during rotation of the tire.

Figure 4A:
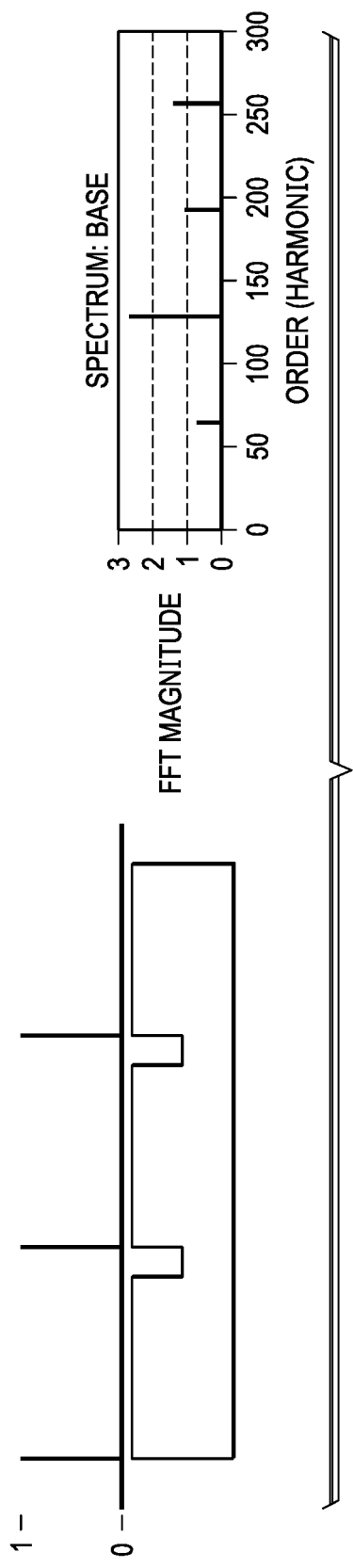
FIGS. 4A-4C graphically represent alternative and exemplary sample impact function waveforms that may be employed to perform a waveform analysis on each of a multitude of randomized pitch subsequences according to an exemplary pitch sequence design methodology.

More specifically, an exemplary methodology for determining the acoustic fingerprint generated by the plurality of pitches within each analyzed and pre-screened pitch subsequence involves the Fast Fourier Transform (FFT) analysis of an excitation signal, or impulse train, that would be produced by the successive impact of the pitches of the subsequence striking the pavement (o other surface) as the tire rotates. Due to the uncertain nature of the excitation force-time relationship caused by each pitch impact, a unit impulse waveform is often used as the waveform to represent the leading edge impact of each pitch. An exemplary unit impulse waveform is represented in FIG. 4A.

Figure 4B:
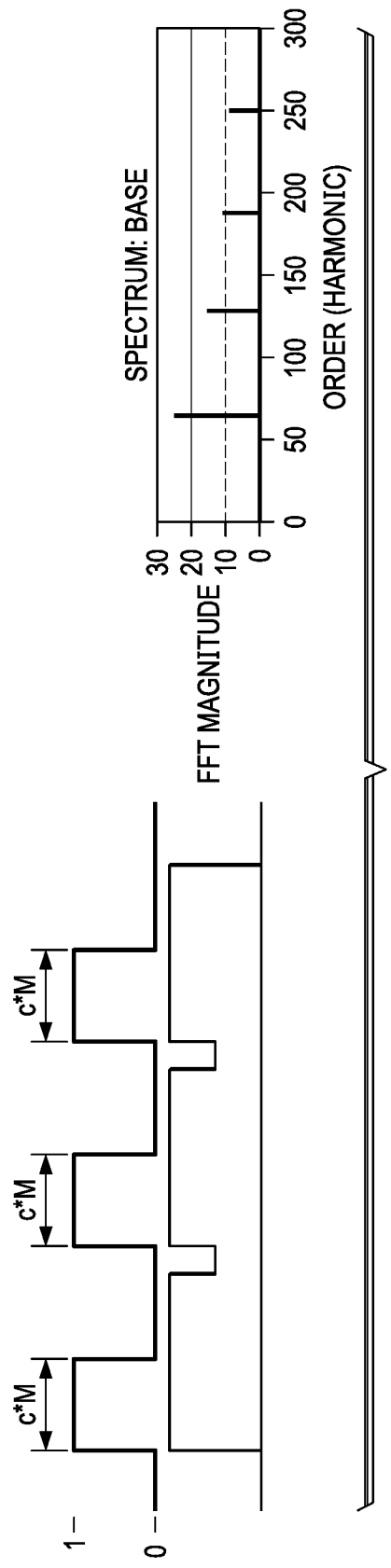
Figure 4C:
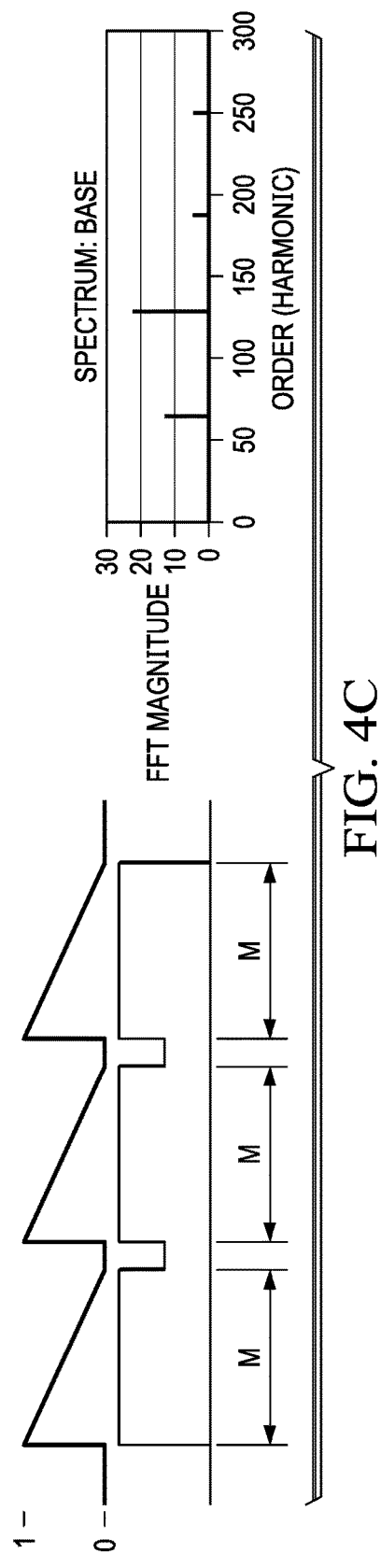

It is also possible that another waveform may be substituted for the unit impulse waveform, especially if another waveform more accurately represents the relative amplitudes at all harmonics through the first 200 orders (i.e., the typical region of interest for tread pattern noise) of the spectrum, as this would allow sequence optimization to target specific orders with higher spectrum amplitudes. One exemplary substitute waveform in the form of a square waveform is represented in FIG. 4B. Another substitute waveform in the form of a triangle waveform is represented in FIG. 4C. A specific waveform may be chosen by experimentally validating the predicted FFT spectrum to the measured FFT spectrum for the frequency range of interest (with emphasis on reducing specific harmonics). As may be observed in FIGS. 4A-4C, the FFT spectrum emphasizes different orders (harmonics) for the same pitch sequence, depending on the impulse waveform chosen.

As would be understood by one of skill in the art, a single harmonic segment will not produce a continuous, repeating impulse train like the full pitch sequence of an entire tire. For a single rotation of a given tire, an individual harmonic segment begins and ends, with a time gap before beginning again. For this reason, a "windowing" technique is preferably employed for proper signal processing when using FFT. The windowing function (also referred to as an apodization or tapering function) is a mathematical function that is zero-valued outside the selected interval. The impulse train is multiplied by the windowing function to reduce the signal to zero at the leading and trailing edges of the harmonic segment in order to approximate a continuous, repeating signal for FFT analysis.

There are many standard windowing functions, including Rectangular, Triangular, Hann, Hamming, Blackman, etc. In one exemplary method embodiment, a Tukey apodization function is used to window the impulse train of each harmonic segment and the FFT of the signal is computed, producing the response frequency spectrum of the subsequence.

Figure 5:
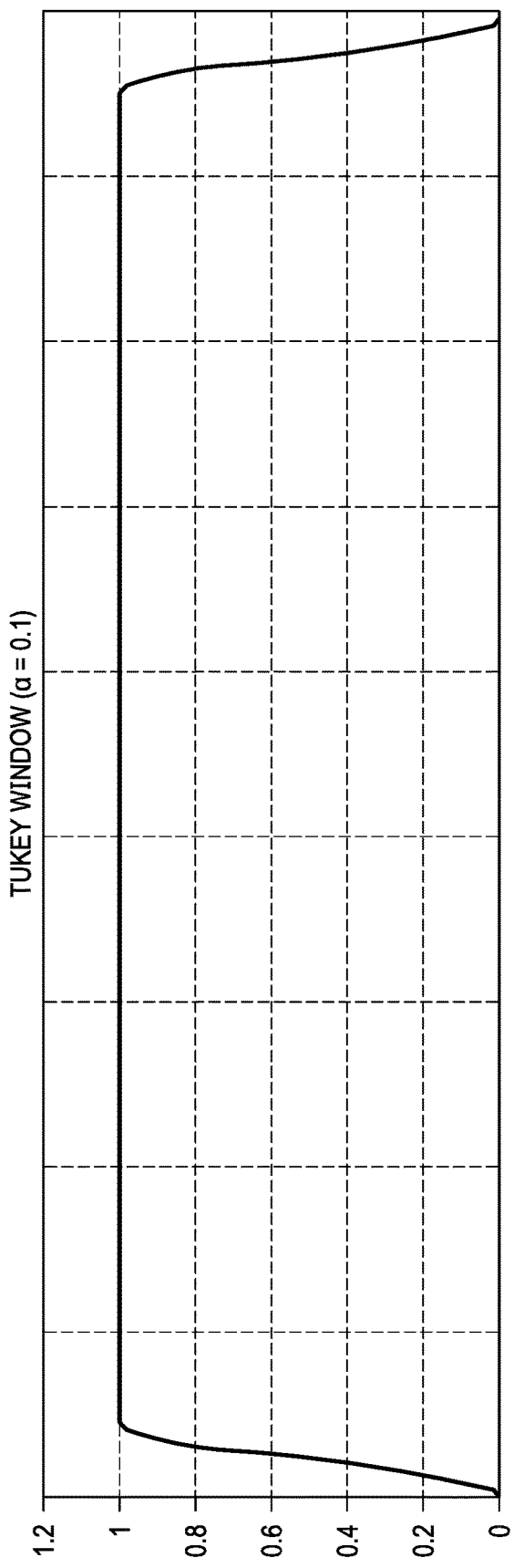
FIG. 5 graphically represents an exemplary windowing technique that may be used in conjunction with the waveform analysis of randomized pitch subsequences according to an exemplary pitch sequence design methodology.

The Tukey apodization is also known as the Tapered Cosine function, and is essentially the positive lobe of a cosine function convolved with a rectangular window. The Tukey apodization may be represented by the following equations:

$$w(n) = \frac{1}{2}\left[1 + \cos\left(\pi\left(\frac{2n}{\alpha(N-1)} - 1\right)\right)\right] \text{ for } 0 \leq n < \frac{\alpha(N-1)}{2}$$

$$w(n) = 1 \text{ for } \frac{\alpha(N-1)}{2} \leq n \leq (N-1)\left(1 - \frac{\alpha}{2}\right)$$

$$w(n) = \frac{1}{2}\left[1 + \cos\left(\pi\left(\frac{2n}{\alpha(N-1)} - \frac{2}{\alpha} + 1\right)\right)\right] \text{ for } (N-1)\left(1 - \frac{\alpha}{2}\right) < n \leq (N-1)$$

where the value of $\alpha$ dictates the width of the flattened portion of the peak of the curve (at $\alpha=0$, the function is completely rectangular, and at $\alpha=1$ the curve is simply the positive lobe of a cosine function). In at least one exemplary pitch sequence design methodology, the value of $\alpha$ is set to 0.1. A graphical representation of a Tukey window with $\alpha=0.1$ is shown in FIG. 5.

Having generated a harmonic noise spectrum for each retained subsequence design, as described above, an exemplary pitch sequence design methodology may then proceed to grade the retained subsequences by grading the quality of said harmonic noise spectrums using a specialized objective function. The objective function may be constructed from weighted values of the peak raw amplitude (which may be normalized to a value of 10) and the standard deviation of the $2^{nd}$ gradient function of the moving average of the FFT spectrum (which may be normalized to a value of 0.5), where the peak raw amplitude is defined as the peak value of the unmodified FFT spectrum over the first 200 orders of the spectrum. The objective function may be similar in nature to the Crest Factor (i.e., peak amplitude/RMS amplitude), but preferably with greater emphasis on the smoothness of the distribution than on the peak amplitude.

Figure 6A:
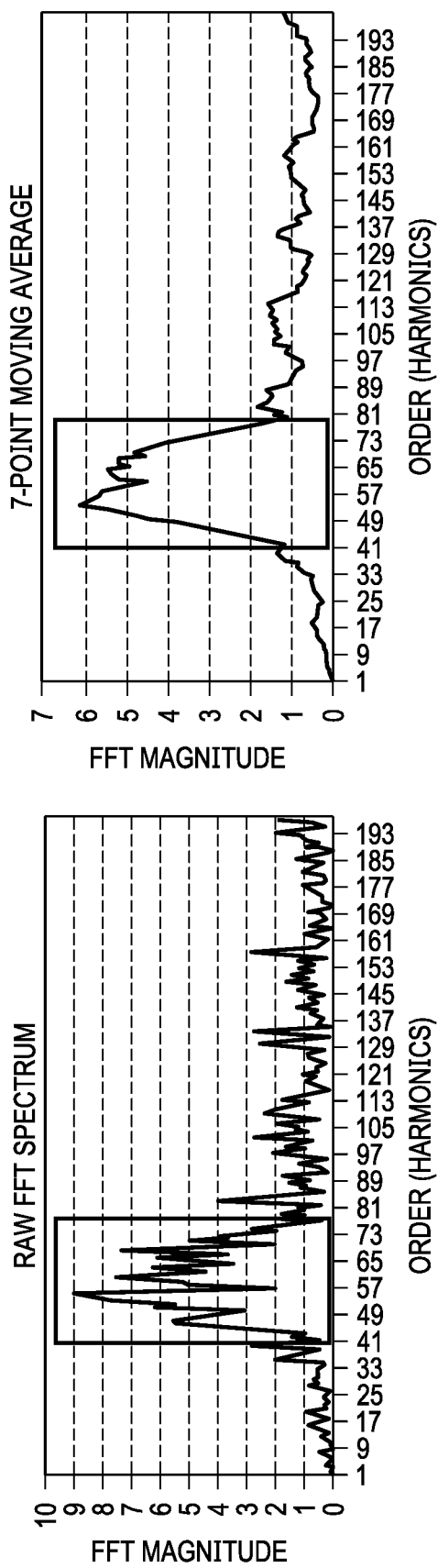
FIGS. 6A-6C graphically represent portions of waveform analysis data that may be used to compute an objective function during an exemplary pitch subsequence sorting and grading operation of an exemplary pitch sequence design methodology.

As graphically represented starting in FIG. 6A, an exemplary process employed to obtain the standard deviation value used in the objective function may be obtained by first computing a seven-point moving average function of the raw FFT spectrum response, such as by using a Savitzky-Golay mathematical filter with a selected window length and a first-degree (linear) polynomial order. This is done to better extract the character of the FFT spectrum response. In one exemplary embodiment, the window length is set to seven.

Figure 6B:
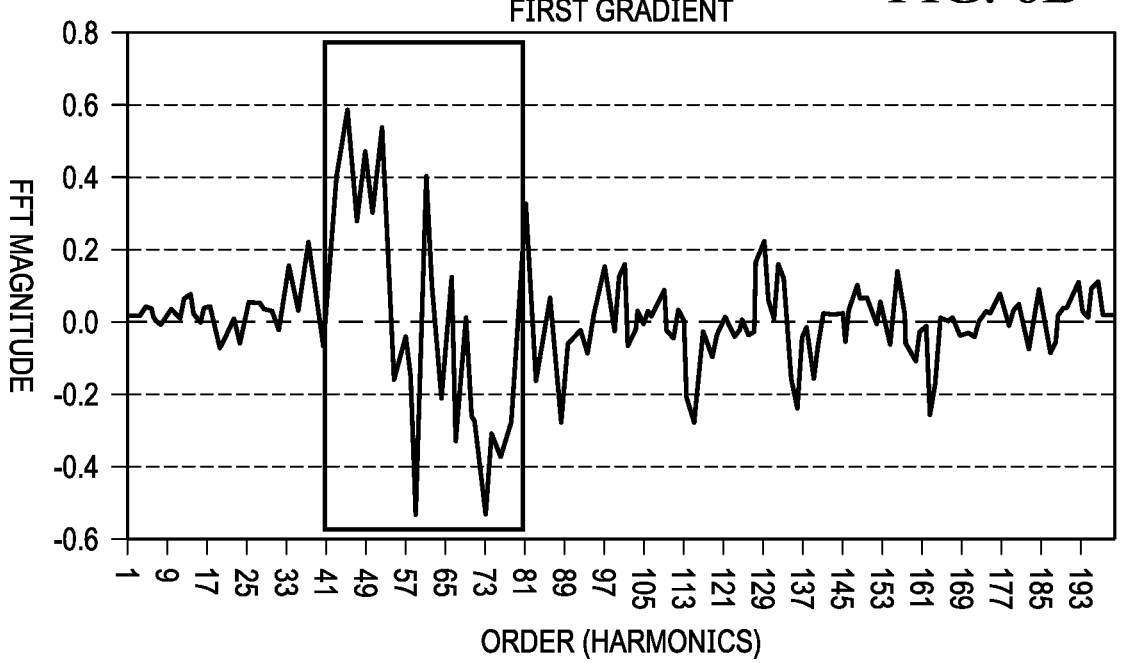

Referring now to FIG. 6B, the first gradient of the moving average function may then be calculated using second-order accurate central differences for interior points and first-order accurate one-sided differences at the boundaries of the moving average curve. The first gradient represents the rate of change of the FFT spectrum with respect to the order and more easily identifies peaks and valleys of the moving average curve.

The second gradient of the moving average function is then calculated as a successive gradient of the first gradient function. The second gradient is calculated to identify changes and reversals in the first gradient function. Larger changes in the first gradient function represent stronger, more isolated peaks in the FFT spectrum. Smaller changes in the first gradient function represent a more even spread of acoustic energy in the FFT spectrum.

Figure 6C:
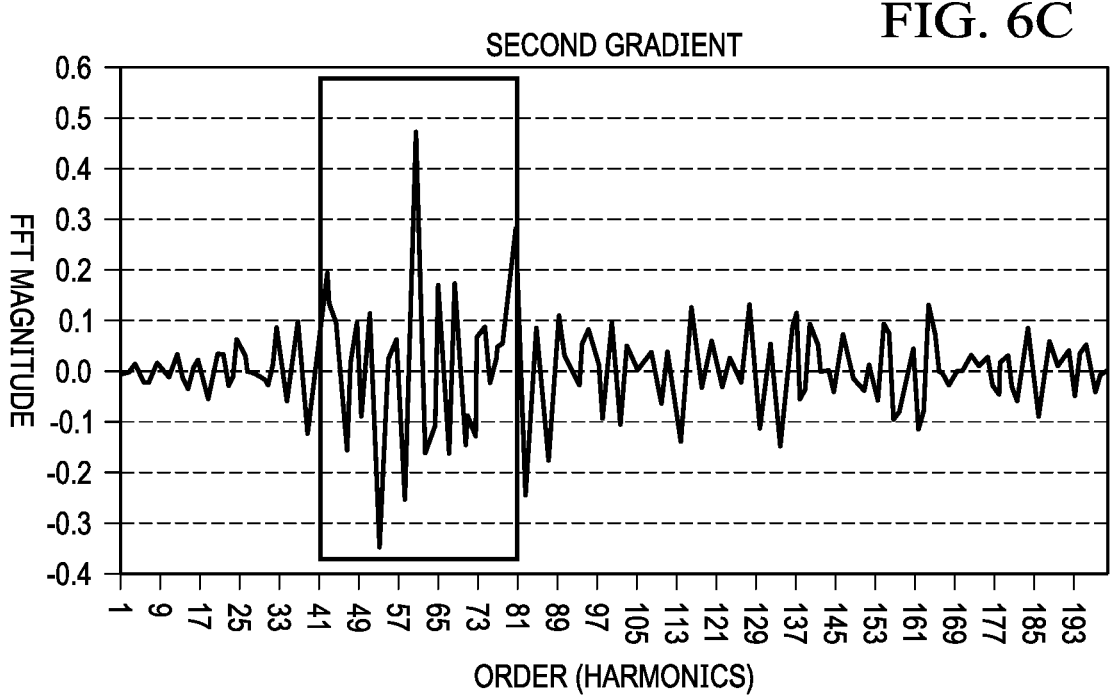

The standard deviation of the second gradient function may be used to quantify how well the acoustic energy associated with a given subsequence is spread across the FFT response spectrum. For individual harmonic segments, calculation of standard deviation may be restricted to a ±10 order window around the peak raw amplitude of the FFT spectrum. For the complete tire pitch sequence, the window may be defined as ±20 orders around the order equal to the total number of pitches in the sequence. This range limit focuses attention on the expected primary noise source, the first fundamental harmonic of the pitch sequence. An example using a window=60±20 orders for a 60-pitch sequence is designated in FIGS. 6A-6C by the box overlying the spectrum plot.

Finally, an objective function using the aforementioned criteria may be calculated from the following equation.

$$Obj\ Fun = 40\left[\frac{raw\ peak\ amplitude}{10}\right] + 60\left[\frac{std\ dev\ of\ second\ gradient}{0.5}\right]$$

As explained above, pitch length is important because it changes the longitudinal stiffness of the pitch. This not only affects the noise energy generated by pitch impact on the road, but also can influence how the associated tire handles (steers) or wears during the passage of that pitch through the road contact zone. Clustered regions that contain predominantly larger pitches (or smaller pitches) may produce noticeable variation in handling feel or irregular wear. Consequently, an exemplary pitch sequence design methodology preferably penalizes pitch sequences containing localized concentrations of predominately large or small pitches. This may be accomplished by calculating and applying a penalty factor to the noise prediction (objective function) for the sequence, which discourages the use of such sequences even if the actual noise prediction is good.

The penalty factor may be a progressively increasing penalty factor. The penalty factor may be applied when the maximum running total of the differences of successive pitch lengths from the "mean" pitch length (cumulative variance) exceeds a specified limit. Application of the penalty factor to the objective function based on the peak value of cumulative variance provides a balanced valuation of the pitch sequence contribution to noise and linear handling performance. An exemplary penalty factor may be represented by the following equation:

Penalty Factor=1.0+0.1×(*MV–NS*)

where, NS=number of pitch lengths; and MV=maximum cumulative variation. It should be noted that this exemplary penalty factor equation is only true for the case where MV>NS. For the case where MV NS, the penalty factor is equal to 1.0.

As an example of penalty factor application, consider a pitch sequence that is comprised of 3 pitch lengths, with the smallest pitch length number designated as 1, the intermediate pitch length number designated as 2, and the largest pitch length number designated as 3. The "mean" pitch length then has a value of 2. Therefore, the differences between adjacent pitch lengths may be calculated as the differences between the pitch numbers of the adjacent pitch lengths. For example, a pitch sequence beginning with pitch length numbers "3, 3, 2, 1, 1, 1, 3, 1, 1, . . . " would produce the following sequence of differences from the mean pitch size: "+1, +1, 0, –1, –1, –1, +1, –1, –1 . . . " A running total of differences (cumulative variation) would resultantly be "+1, +2, +2, +1, 0, –1, 0, –1, –2, . . . .

Figure 7A:
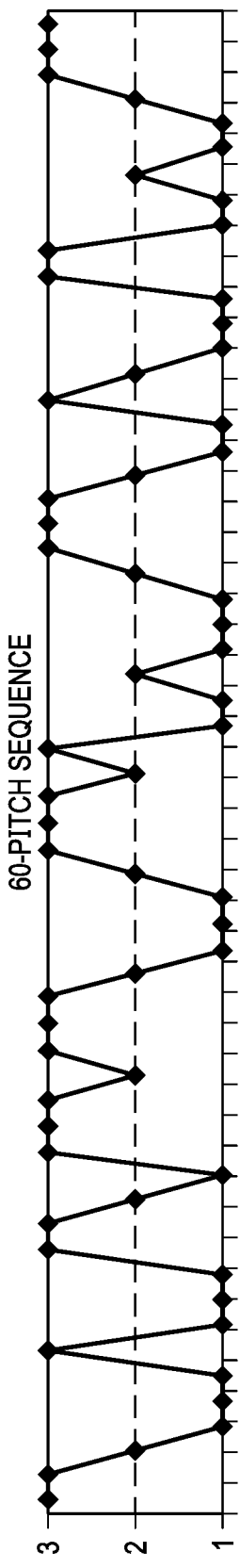
FIGS. 7A-7B graphically represent the sequencing of different pitch sizes and the running total pitch size variation from the mean that may be used to compute a penalty factor in conjunction with the objective function represented in FIGS. 6A-6C during an exemplary pitch subsequence sorting and grading operation of an exemplary pitch sequence design methodology.
Figure 7B:
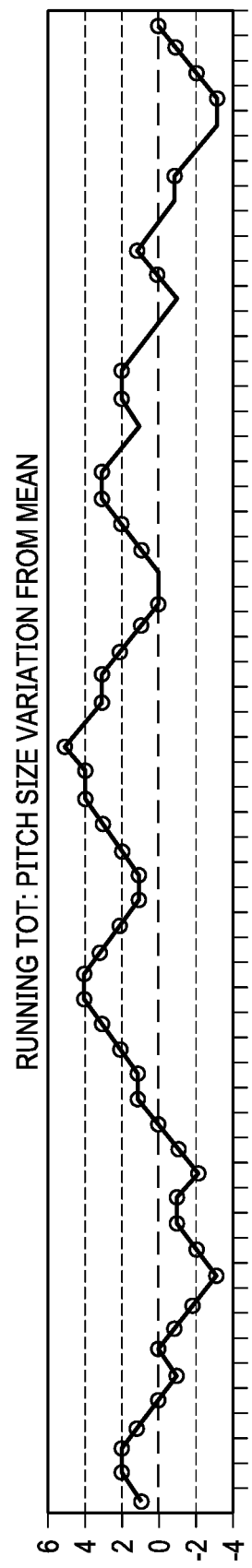

An exemplary graphical representation of the above-described exemplary sequence and running total of differences are respectively provided in FIGS. 7A-7B. The penalty Factor (PF) for the above example where the number of pitch sizes (NS)=3; the maximum pitch size variation (MV)=5; and for MV>NS, may then be calculated from the above equation as:

*PF*=1.0+0.1\*(*MV–NS*)=1.2

Application of the penalty factor to the objective function helps to prioritize the subsequences with the best harmonic noise spectrums that also satisfy good design practice for linear handling performance. These subsequences may then be retained and further used, as described below. The number of retained subsequences may vary. For example, only the best three subsequences from all the valid candidates of each harmonic segment may be retained. In the case of an exemplary four harmonic segment design, this would result in retention of subsequences 1a, 1b, 1c, 2a, 2b, 2c, 3a, 3b, 3c, 4a, 4b, and 4c.

Upon completion of sorting and grading the subsequences to obtain a set of subsequence design candidates that minimize tonality in each harmonic segment, as described above, the retained segment subsequences are subsequently assembled to produce a full pitch sequence. All of the various permutations resulting from the retained candidate subsequences for all harmonic segments may be tested and evaluated to identify the best full pitch sequence. The analysis may be further extended to consider all possible sequencing of harmonic segments.

Testing and evaluation of each of the various possible full pitch sequences may be accomplished in a similar manner to the pitch subsequence FFT waveform analysis techniques described above. That is, full pitch sequence analysis may involve assuming an impact waveform, generating a full impulse train for each full pitch sequence, and subsequently performing FFT analysis to generate the response frequency spectrum that would be produced by the full pitch sequence during tire rotation. A unit impulse function may be used as the waveform, or another waveform may be used, as described above.

As with subsequence analysis, the sound quality of the harmonic noise spectrum associated with each full pitch sequence design is then graded by use of full pitch objective function that may be constructed from weighted values of the peak raw amplitude and the standard deviation of the $2^{nd}$ gradient function of the full pitch harmonic noise response frequency spectrum. Such an objective function combines the effects of peak value and smoothness (i.e., reduced size and number of tonal spikes) of the response. The minimum objective function may represent the noise spectrum having the most similarity to a "white noise" spectrum.

Full pitch sequences must also meet the afore-mentioned design criteria for wear (e.g., limitation on occurrences of small pitches adjacent to large pitches). As such the balancing of noise and handling consequences of the analyzed pitch sequences is accomplished by calculating a new penalty factor signifying the pitch length homogeneity of the full pitch sequence. A new penalty factor for a given full pitch sequence may be calculated in the same manner as described above for an individual subsequence and applied to the full pitch objective function to help determine the best full pitch sequence.

Additional sound quality improvements to a best full pitch sequence candidate may be realized by making slight modifications to the quantities of each pitch length, or minor adjustments to middle-sized pitch ratios. In this regard, computer simulation may be utilized to systematically perform a parameter study to determine optimized settings for these design variables. More particularly, this technique repeats the entire design method for each combination of design variable settings, including new subsequences, on the way to generating the full tire pitch sequence. Constraints for admissible pitch ratio changes and pitch length quantities vary based on the application of the pitch sequence for a specific tire line, and must be decided by the design engineer skilled in the art.

EXAMPLE

One example of objective function improvement to provide optimized pitch sequence design is described below and graphically represented in FIGS. 8A-8D. An optimization study was conducted for the purpose of determining the ideal combination of pitch lengths and quantities for a 70-pitch sequence tire tread pattern using an exemplary pitch sequence design methodology. As shown in FIG. 8A, the pitch sequence pattern used in the study included four pitch lengths, with pitch length #1 being a small pitch length; pitch length #2 being a medium pitch length; pitch length #3 being a large pitch length; and pitch length #4 being an extra large pitch length. During the study, the #1 (small) and #4 (extra large) pitch lengths were maintained at constant pitch ratios of 1.0 and 1.4, respectively. The pitch ratio of the #2 (medium) pitch length was varied from 1.125 to 1.2, while the pitch ratio #3 (large) pitch length was varied from 1.25 to 1.375. The quantities of the #1 and #4 pitch lengths were constrained to be equal, varying from 15 to 20 pitches each. The remaining number of pitches were divided equally between the #2 and #3 pitch lengths.

For each optimization iteration (i.e., combination of design variables), an ideal sequence was generated according to an exemplary pitch sequence design methodology as described above. The particular optimization algorithm used in this exemplary study was the Coliny Evolutionary Algorithm, which was iterated over the design variable settings, ultimately identifying the minimized objective value. An ordered array of the objective function values from all optimization runs is graphically illustrated in FIG. 8B.

As may be observed in FIG. 8C, the difference between pitch ratios (lengths) #2 and #3 (PRdiff) versus the objective function clearly shows an improving trend as the difference between the pitch lengths is increased. The trend is depicted as an average objective function value for all pitch quantity variants.

As further represented in FIG. 8D, the quantity of each pitch length (also described as the distribution of pitch quantities) demonstrates a tendency for this 70 pitch, 4 pitch size sequence. Particularly, FIG. 8D indicates that the best objective function values tend to occur when quantities of the #1 (small) pitch lengths and #4 (extra large) pitch lengths are set at 18, and the number of #2 (medium) pitch lengths and #3 pitch lengths are both set to 17. This tendency is shown in FIG. 8D as an average objective function value for all pitch length design variants.

Figure 9:
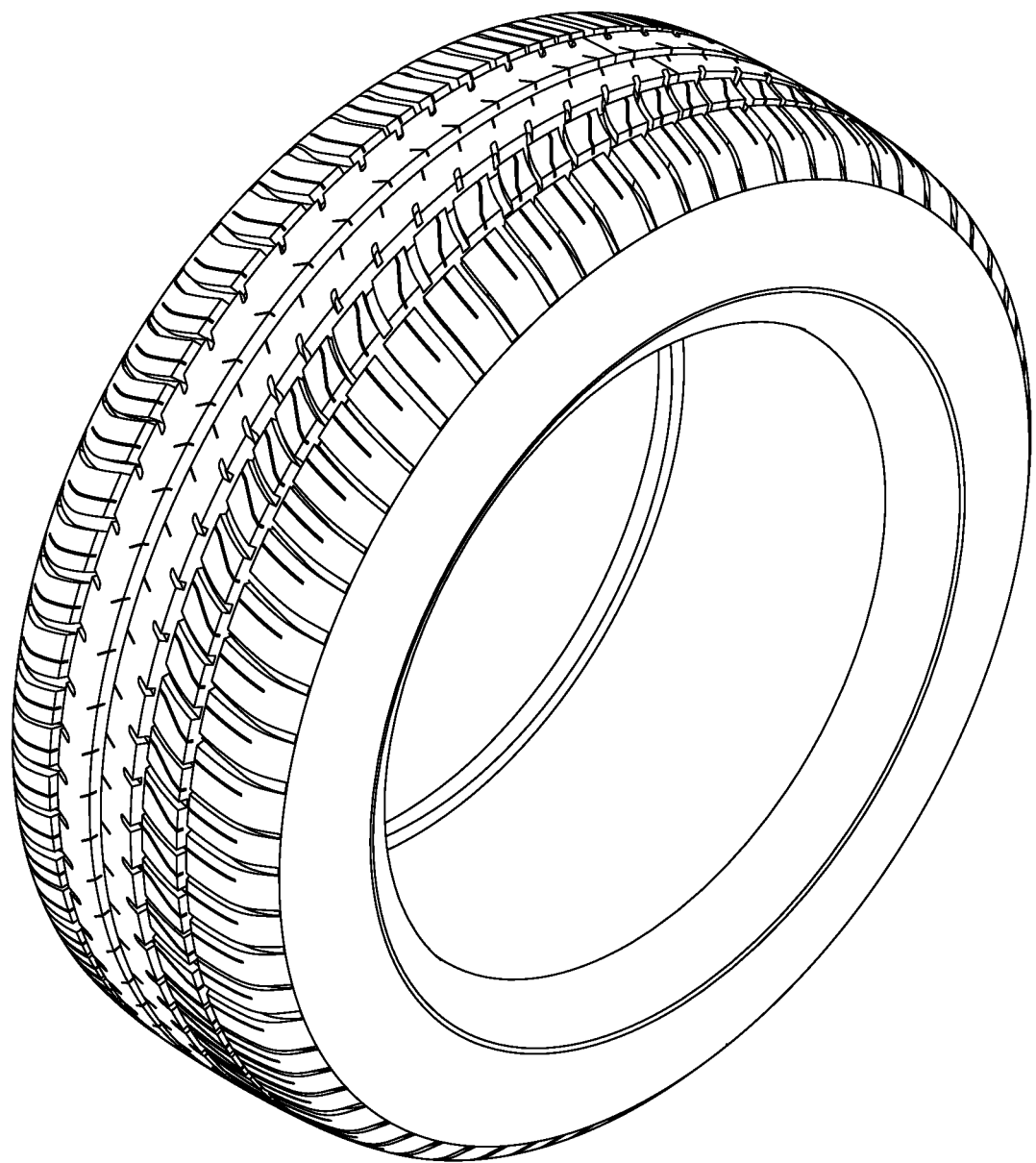
FIG. 9 illustrates an exemplary tire having an exemplary noise-reducing tread pattern created using an exemplary pitch sequence design methodology.

One exemplary embodiment of a tire having a best full pitch sequence as determined according to an exemplary pitch sequence design methodology described herein is presented in FIG. 9. The tire of FIG. 9 is presented only for the purpose of illustration, and one of skill in the art would certainly realize that pitch sequences having a multitude of other designs may be created using an exemplary pitch sequence design methodology.

Figure 10:
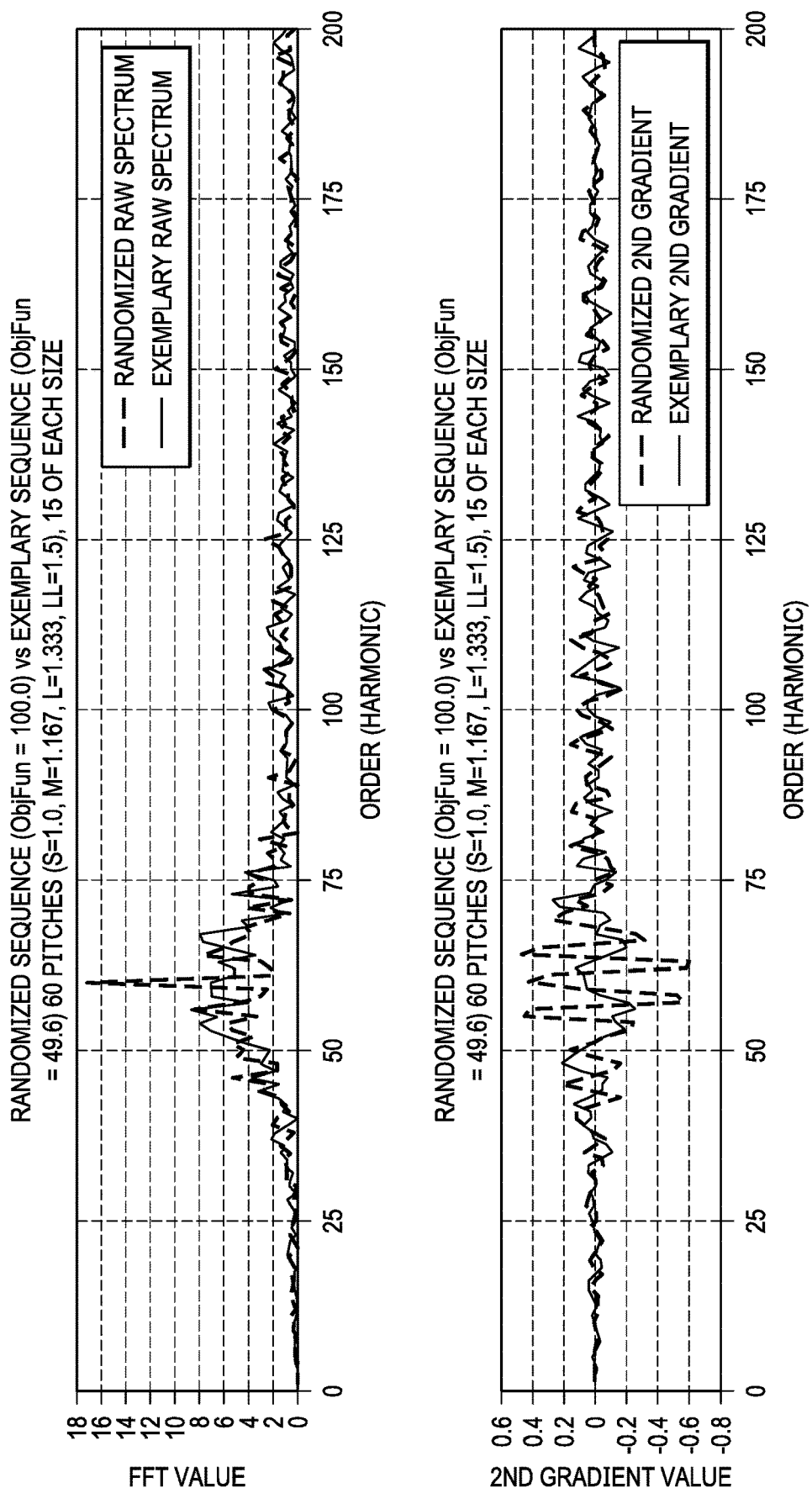
FIG. 10 graphically illustrates an improved tire tread waveform spectrum obtained by applying an exemplary pitch sequence design methodology to a randomized 60-pitch sequence having equal quantities of 4 equally-spaced pitch sizes.

FIG. 10 graphically depicts the raw and second gradient pitch sequence harmonic noise spectrums generated during rotation of the tire of FIG. 9. As indicated in the graphs of FIG. 10, the exemplary optimized pitch sequence of the exemplary tire of FIG. 9 minimizes objectionable tonal qualities and disperses the acoustic energy produced during tire rotation across a wider frequency band, such as a frequency band similar to that of so-called white noise, when compared to a simple randomized pitch sequence.

While certain embodiments of the inventive concept are described in detail above, the scope of the inventive concept is not considered limited by such disclosure, and modifications are possible without departing from the spirit of the inventive concept as evidenced by the following claims:

What is claimed is:

1. A method for designing a noise-minimizing tire pitch sequence and implementing said pitch sequence in a vehicle tire, comprising:

dividing the tire into a quantity of circumferential harmonic segments having diverse arc lengths;

selecting pitch lengths and respective quantities of the load-bearing pitches and apportioning said pitches among the harmonic segments of the tire to form a plurality of pitch subsequences;

randomly arranging the pitch lengths within the subsequences;

pre-screening the randomized subsequences to produce a set of candidate subsequences that limit occurrences of large pitches next to small pitches;

determining, relative to the set of candidate subsequences, the cumulative variation of differences between consecutive pitch lengths from a mean pitch length;

using a maximum cumulative variation to calculate a penalty factor for any candidate subsequences having concentrated groups of large or small pitches;

assuming an impact waveform and using the waveform to create an impulse train for subsequent analysis of each candidate subsequence;

conducting a waveform analysis to generate a response frequency spectrum for each candidate subsequence;

calculating a subsequence objective function, and grading the generated response frequency spectrum associated with each candidate subsequence using the subsequence objective function;

applying the penalty factor to the objective function, and further grading each candidate subsequence such that the objective function is minimized;

assembling at least one full pitch sequence to produce at least one candidate full pitch sequence by ordering selected ones of the graded subsequences;

pre-screening the at least one candidate full pitch sequence to limit the occurrences of large pitches next to small pitches;

determining, relative to the at least one candidate full pitch sequence, the cumulative variation of differences between consecutive pitch lengths from the mean pitch length;

using the maximum cumulative variation to calculate a second penalty factor for any candidate full pitch sequences having concentrated groups of large or small pitches;

assuming a second impact waveform and using the second impact waveform to create an impulse train for subsequent analysis of each candidate full pitch sequence;

conducting a second waveform analysis to generate a response frequency spectrum for each candidate full pitch sequence;

calculating a full pitch sequence objective function, and grading the generated response frequency spectrum associated with each candidate full pitch sequence using the full pitch sequence objective function;

applying the second penalty factor to the full pitch sequence objective function, and further grading each candidate full pitch sequence such that the full pitch sequence objective function is minimized;

using the grading of each analyzed full pitch sequence to select a full pitch sequence that will minimize noise during rotation of the tire; and incorporating the selected full pitch sequence into a tread pattern of a tire mold that is usable to produce a noise-reducing vehicle tire.

2. The method of claim 1, wherein the process of randomly arranging the order of the pitches within each subsequence is performed iteratively and is conducted with a goal of achieving maximum tonal suppression within each harmonic segment of the tire.

3. The method of claim 1, further comprising:

pre-screening randomized subsequences to eliminate those subsequences that would likely result in irregular wear or undesirable handling characteristics;

wherein pre-screening is performed by limiting the number of times a pitch of largest length occurs adjacent to a pitch of smallest length.

4. The method of claim 1, wherein the impact waveform is selected from the group consisting of a unit impulse waveform, a square waveform and a triangle waveform.

5. The method of claim 1, wherein:

the subsequence objective function is constructed from weighted values of the peak raw amplitude and the standard deviation of a 2nd gradient function of a moving average of the waveform analysis spectrum, where the peak raw amplitude and standard deviation values are taken over a range of ±10 orders from the order at which the peak amplitude occurs; and the subsequence objective function is represented by the formula:

$$Obj\ Fun = 40\left[\frac{raw\ peak\ amplitude}{10}\right] + 60\left[\frac{std\ dev\ of\ second\ gradient}{0.5}\right].$$

6. The method of claim 1, wherein:

the full pitch sequence objective function is constructed from weighted values of the peak raw amplitude and the standard deviation of a 2nd gradient function of a full pitch harmonic noise response frequency spectrum over a range of ±20 orders from the total number of pitches;

the full pitch sequence objective function is represented by the formula:

$$Obj\ Fun = 40\left[\frac{raw\ peak\ amplitude}{10}\right] + 60\left[\frac{std\ dev\ of\ second\ gradient}{0.5}\right]$$

and, the minimum objective function represents the noise spectrum having the most similarity to a white noise frequency spectrum.

7. The method of claim 1, wherein:

the penalty factor is designed to provide a balanced valuation of the pitch sequence contribution to noise and linear handling performance, and disfavors localized concentrations of predominately large or small pitch lengths; and wherein the penalty factor is represented by the formula:

Penalty Factor=$1.0+0.1\times(MV-NS)$ as long as MV >NS, where NS=number of pitch lengths and MV=maximum cumulative variation.

8. The method of claim 1, wherein various permutations resulting from all of the candidate subsequences are tested and evaluated to identify the best full pitch sequence.

9. The method of claim 1, further comprising additionally reducing undesirable tonal noise tendencies by adjusting the quantities of each pitch length and making changes to middle pitch ratios through a structured parametric evaluation.

10. A method for producing a noise-reducing vehicle tire, comprising:

developing a desired pitch block design;

developing a tread pattern using the pitch block design, the tread pattern based at least in part of the anticipated use of the vehicle tire and on accepted tread pattern design practices;

based on the length of the pitch blocks and the circumference of the vehicle tire, developing and selecting a pitch sequence for the tread pattern and creating a tire mold according to the method of claim 1; and molding the vehicle tire using the mold.

11. The method of claim 10, wherein various permutations resulting from all of the candidate subsequences for all harmonic segments are tested and evaluated to identify the best full pitch sequence.

12. The method of claim 10, wherein the molded vehicle tire will disperse the acoustic energy produced during rolling contact of the tire with a surface across a wide frequency range similar to that of white noise.

13. A method for designing a noise-minimizing tire pitch sequence and implementing said pitch sequence in a vehicle tire, comprising:

dividing the tire into a quantity of circumferential harmonic segments having diverse arc lengths;

apportioning a quantity of load-bearing pitches of different pitch lengths among the harmonic segments to form a plurality of pitch subsequences, each pitch subsequence containing an approximately equal percentage of each pitch length;

randomly arranging the pitches within each subsequence in an iterative manner to produce some number of valid subsequences;

retaining some number of the valid subsequences as candidate subsequences for further analysis;

assuming an impact waveform for each pitch block, and using said impact waveform to create an impulse train corresponding to each candidate subsequence;

conducting a waveform analysis of each candidate subsequence impulse train to generate a harmonic noise response frequency spectrum that would be produced by the associated subsequence during rolling contact of the tire with a surface;

grading each candidate subsequence by grading the generated harmonic noise response frequency spectrum associated therewith using a subsequence objective function;

assembling at least one full pitch sequence from selected ones of the graded subsequences to produce at least one candidate full pitch sequence;

assuming a second impact waveform for each pitch block, and using said second impact waveform to create an impulse train corresponding to each candidate full pitch sequence;

conducting a second waveform analysis of candidate full pitch sequence impulse trains to generate a harmonic noise response frequency spectrum that would be produced by each associated full pitch sequence during rolling contact of the tire with a surface;

grading each analyzed full pitch sequence by grading the generated harmonic noise response frequency spectrum associated therewith using a specialized full pitch sequence objective function;

using the grading of each analyzed full pitch sequence to select a full pitch sequence that will minimize noise during rotation of the tire; and incorporating the selected full pitch sequence into a tread pattern of a tire mold that is usable to produce a noise-reducing vehicle tire.

14. The method of claim 13, further comprising:
pre-screening randomized subsequences to eliminate those subsequences that would likely result in irregular wear or undesirable handling characteristics;
wherein pre-screening is performed by limiting the number of times a pitch of largest length occurs adjacent to a pitch of smallest length.

15. The method of claim 13, wherein the impact waveform is selected from the group consisting of a unit impulse waveform, a square waveform and a triangle waveform.

16. The method of claim 13, wherein:
the subsequence objective function is constructed from weighted values of the peak raw amplitude and the standard deviation of the 2nd gradient function of the moving average of the waveform analysis spectrum, where the peak raw amplitude and standard deviation values are taken over a range of ±10 orders from the order at which the peak amplitude occurs; and the subsequence objective function is represented by the formula:

$$Obj\ Fun = 40\left[\frac{\text{raw peak amplitude}}{10}\right] + 60\left[\frac{\text{std dev of second gradient}}{0.5}\right].$$

17. The method of claim 13, wherein:
the full pitch sequence objective function is constructed from weighted values of the peak raw amplitude and the standard deviation of a 2nd gradient function of a full pitch harmonic noise response frequency spectrum over a range of ±20 orders from the total number of pitches;
the full pitch sequence objective function is represented by the formula:

$$Obj\ Fun = 40\left[\frac{\text{raw peak amplitude}}{10}\right] + 60\left[\frac{\text{std dev of second gradient}}{0.5}\right]$$

and, the minimum objective function represents the noise spectrum having the most similarity to a white noise frequency spectrum.

18. The method of claim 13, wherein:
the penalty factor disfavors localized concentrations of predominately large or small pitch lengths; and
wherein the penalty factor is represented by the formula:

Penalty Factor=1.0+0.1×(MV−NS)

as long as MV >NS, where NS=number of pitch lengths and MV=maximum cumulative variation.

19. The method of claim 13, further comprising additionally reducing undesirable tonal noise tendencies by adjusting pitch quantities of each pitch length and making changes to middle pitch ratios through a structured parametric evaluation.

* * * * *

UNITED STATES PATENT AND TRADEMARK OFFICE
CERTIFICATE OF CORRECTION

PATENT NO. : 11,186,123 B2
APPLICATION NO. : 16/114952
DATED : November 30, 2021
INVENTOR(S) : Samuel B. Knisley Page 1 of 1

It is certified that error appears in the above-identified patent and that said Letters Patent is hereby corrected as shown below:

In the Specification

Column 4, Line 48, delete "Li $L_n$." and insert -- $L_1$ ... $L_n$. --.

Column 9, Line 58, delete "MV NS" and insert -- MV ≤ NS --.

Signed and Sealed this
Twenty-fifth Day of January, 2022

Drew Hirshfeld
*Performing the Functions and Duties of the
Under Secretary of Commerce for Intellectual Property and
Director of the United States Patent and Trademark Office*